United States Patent
Reeves et al.

(10) Patent No.: US 12,344,984 B2
(45) Date of Patent: Jul. 1, 2025

(54) LAUNDRY APPLIANCES WITH CUSTOMIZED FEATURES

(71) Applicant: Haier US Appliance Solutions, Inc., Wilmington, DE (US)

(72) Inventors: Joshua Reeves, Louisville, KY (US); Sean Simpson, Louisville, KY (US); Stannard Nathan Phelps, Louisville, KY (US); Mary Joy Frances Cardilino, Louisville, KY (US); Ryan James Scheckelhoff, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 294 days.

(21) Appl. No.: 17/869,041

(22) Filed: Jul. 20, 2022

(65) Prior Publication Data

US 2024/0026589 A1    Jan. 25, 2024

(51) Int. Cl.
| | | |
|---|---|---|
| *D06F 34/28* | (2020.01) | |
| *D06F 34/05* | (2020.01) | |
| *G05B 15/02* | (2006.01) | |
| *G06F 3/0482* | (2013.01) | |
| *G06F 3/0484* | (2022.01) | |

(52) U.S. Cl.
CPC ............ *D06F 34/28* (2020.02); *D06F 34/05* (2020.02); *G05B 15/02* (2013.01); *G06F 3/0482* (2013.01); *G06F 3/0484* (2013.01)

(58) Field of Classification Search
CPC .......... D06F 34/05; D06F 34/28; D06F 33/32; D06F 2101/20; G05B 15/02; G06F 3/048
See application file for complete search history.

(56) References Cited

U.S. PATENT DOCUMENTS

| | | |
|---|---|---|
| 6,502,265 B2 | 1/2003 | Blair et al. |
| 7,802,335 B2 | 9/2010 | Hoppe et al. |
| 2004/0107510 A1 | 6/2004 | Buckroyd et al. |
| 2012/0056827 A1* | 3/2012 | Kim .................. D06F 33/30 345/173 |
| 2013/0311610 A1* | 11/2013 | Kim .................. H04L 12/2825 709/217 |
| 2015/0234829 A1* | 8/2015 | Yoshitake ............ G06F 16/35 707/723 |
| 2015/0345068 A1* | 12/2015 | Coffman ............. G06F 3/0488 715/771 |
| 2016/0312396 A1* | 10/2016 | Cruickshank ....... H04L 12/2829 |
| 2019/0153648 A1* | 5/2019 | Clayton .............. G06F 3/0482 |

(Continued)

FOREIGN PATENT DOCUMENTS

| | | |
|---|---|---|
| CN | 102912590 B | 5/2017 |
| CN | 106676833 A | 5/2017 |

(Continued)

*Primary Examiner* — Rami R Okasha
(74) *Attorney, Agent, or Firm* — Dority & Manning, P.A.

(57) ABSTRACT

A method of operating a laundry appliance includes displaying a searchable and sortable list of available cycles for the laundry appliance on a user interface associated with the laundry appliance. The method also includes receiving a user input. The user input includes a selected cycle from the list of cycles. The method further includes downloading the selected cycle to the laundry appliance and activating the laundry appliance according to the downloaded cycle.

17 Claims, 6 Drawing Sheets

(56) References Cited

U.S. PATENT DOCUMENTS

| | | | |
|---|---|---|---|
| 2019/0198021 A1* | 6/2019 | Lee | G10L 15/30 |
| 2020/0190721 A1* | 6/2020 | Kim | D06F 33/00 |
| 2020/0248361 A1 | 8/2020 | Bae et al. | |
| 2021/0381149 A1* | 12/2021 | Park | D06F 58/34 |
| 2022/0243375 A1* | 8/2022 | Chu | D06F 34/32 |
| 2022/0325460 A1* | 10/2022 | Kim | H04M 1/72415 |
| 2023/0095648 A1* | 3/2023 | Kim | G06N 3/09 |
| | | | 706/12 |
| 2023/0143674 A1* | 5/2023 | Reeves | D06F 58/46 |
| | | | 34/482 |
| 2023/0366139 A1* | 11/2023 | Yoon | D06F 33/69 |

FOREIGN PATENT DOCUMENTS

| | | |
|---|---|---|
| CN | 103966797 B | 2/2018 |
| CN | 104420147 B | 3/2018 |
| CN | 108930126 B | 10/2020 |
| KR | 102070783 B1 | 1/2020 |
| KR | 20210063082 A | 6/2021 |
| WO | WO2019066561 A1 | 4/2019 |

* cited by examiner

LAUNDRY APPLIANCES WITH CUSTOMIZED FEATURES

FIELD OF THE INVENTION

The present subject matter relates generally to laundry appliances with features that are customized to a specific user.

BACKGROUND OF THE INVENTION

Laundry appliances, e.g., a washer and/or dryer, are utilized generally for a variety of tasks by a variety of users. Generally, a user must manually activate such appliances in order to utilize the basic functions of the appliances.

Some laundry appliances are capable of more advanced or specialized functions as well as the basic functions. Such advanced or specialized functions may be downloaded and installed to enhance and expand the capabilities of the laundry appliance. However, such downloadable functions may be numerous and widely varied, which may make it difficult for users to locate and select the particular features which may be most of interest to them.

Accordingly, there exists a need for laundry appliances with greater responsiveness to a specific user, such as methods of operating laundry appliances that include, or laundry appliances that are configured for, creating or downloading one or more custom cycles specific to a particular user would be desired.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of operating a laundry appliance is provided. The method includes generating, by a remote computing device, a list of cycles for the laundry appliance. Each cycle has one or more stages and one or more operating parameters for the laundry appliance associated with each stage thereof. The method also includes displaying the list of cycles on a user interface associated with the laundry appliance. The method further includes receiving a user input. The user input includes a selected cycle from the list of cycles. The method also includes downloading the selected cycle to the laundry appliance and activating the laundry appliance according to the downloaded cycle.

In accordance with another embodiment of the present disclosure, a method of operating a laundry appliance is provided. The method includes displaying a searchable and sortable list of available cycles for the laundry appliance on a user interface associated with the laundry appliance. The method also includes receiving a user input. The user input includes a selected cycle from the list of cycles. The method further includes downloading the selected cycle to the laundry appliance and activating the laundry appliance according to the downloaded cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
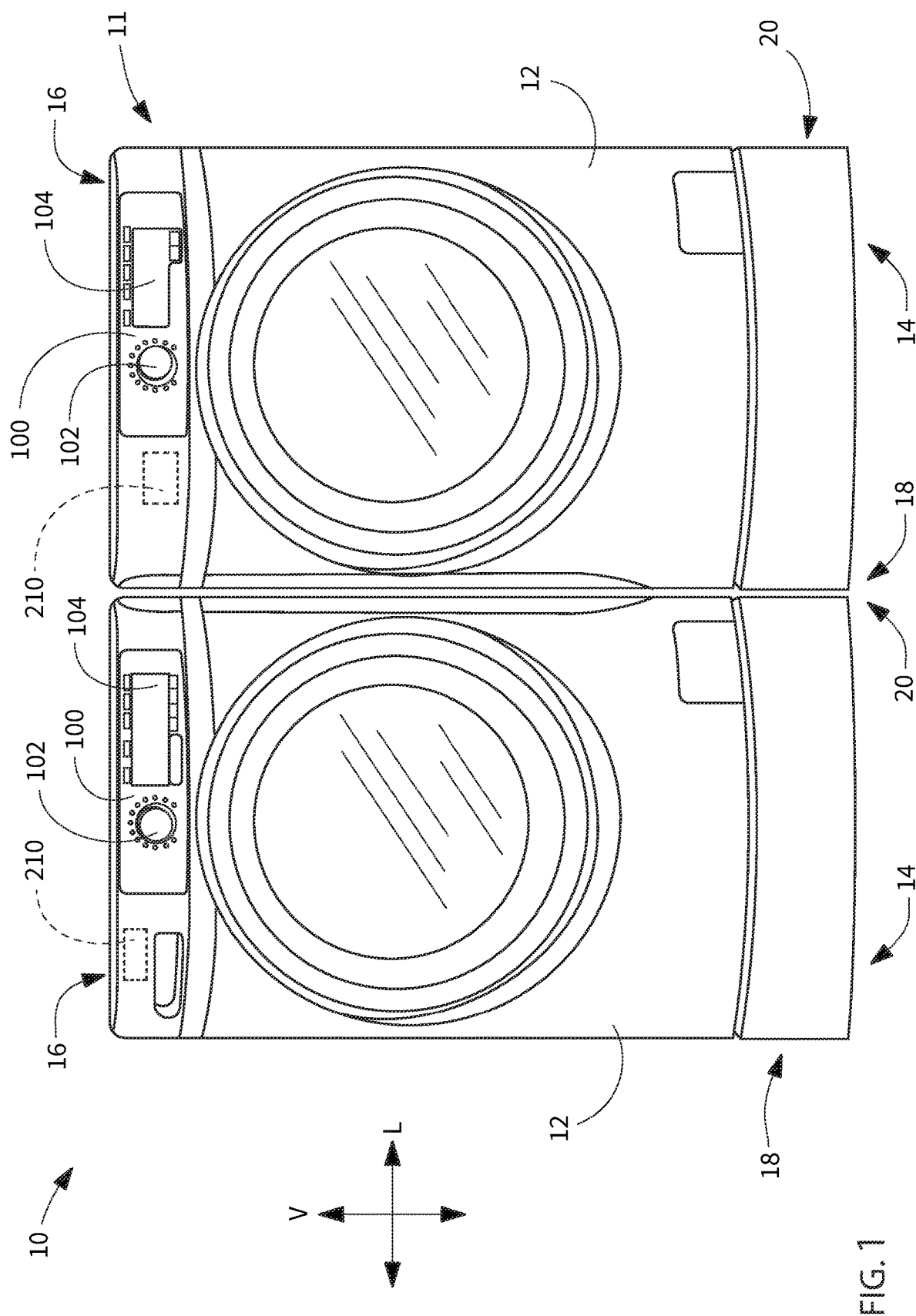
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the terms "clothing," "articles," and the like may include but need not be limited to fabrics, textiles, garments, linens, papers, or other items which may be cleaned, dried, and/or otherwise treated in a laundry appliance. Furthermore, the terms "load" or "laundry load" refers to the combination of clothing that may be washed together in a washing machine or dried together in a dryer appliance and may include a mixture of different or similar articles of clothing of different or similar types and kinds of fabrics, textiles, garments and linens within a particular laundering process. For example, the terms "clothing" or "articles" include but need not be limited to fabrics, textiles, garments, linens, papers, or other similar items. Furthermore, the term "load" or "laundry load" refers to the combination of clothing/articles that may be washed together in a washing machine or dried together in a dryer appliance 11 (e.g., clothes dryer) and may include a mixture of different or similar articles of clothing of different or similar types and kinds of fabrics, textiles, garments and linens within a particular laundering process.

Figure 2:
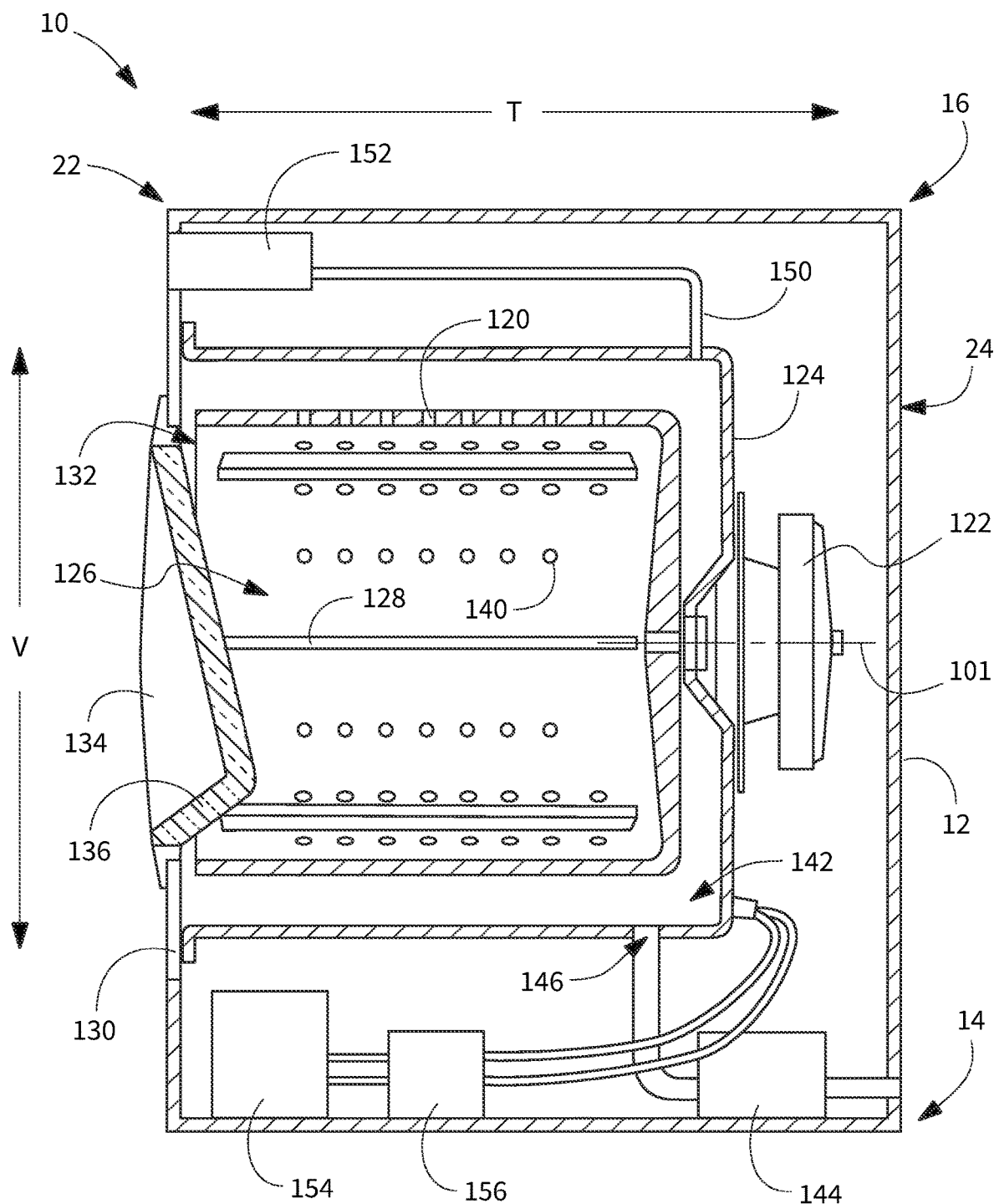
FIG. 2 provides a transverse cross-sectional view of the exemplary washing machine appliance of FIG. 1.
Figure 3:
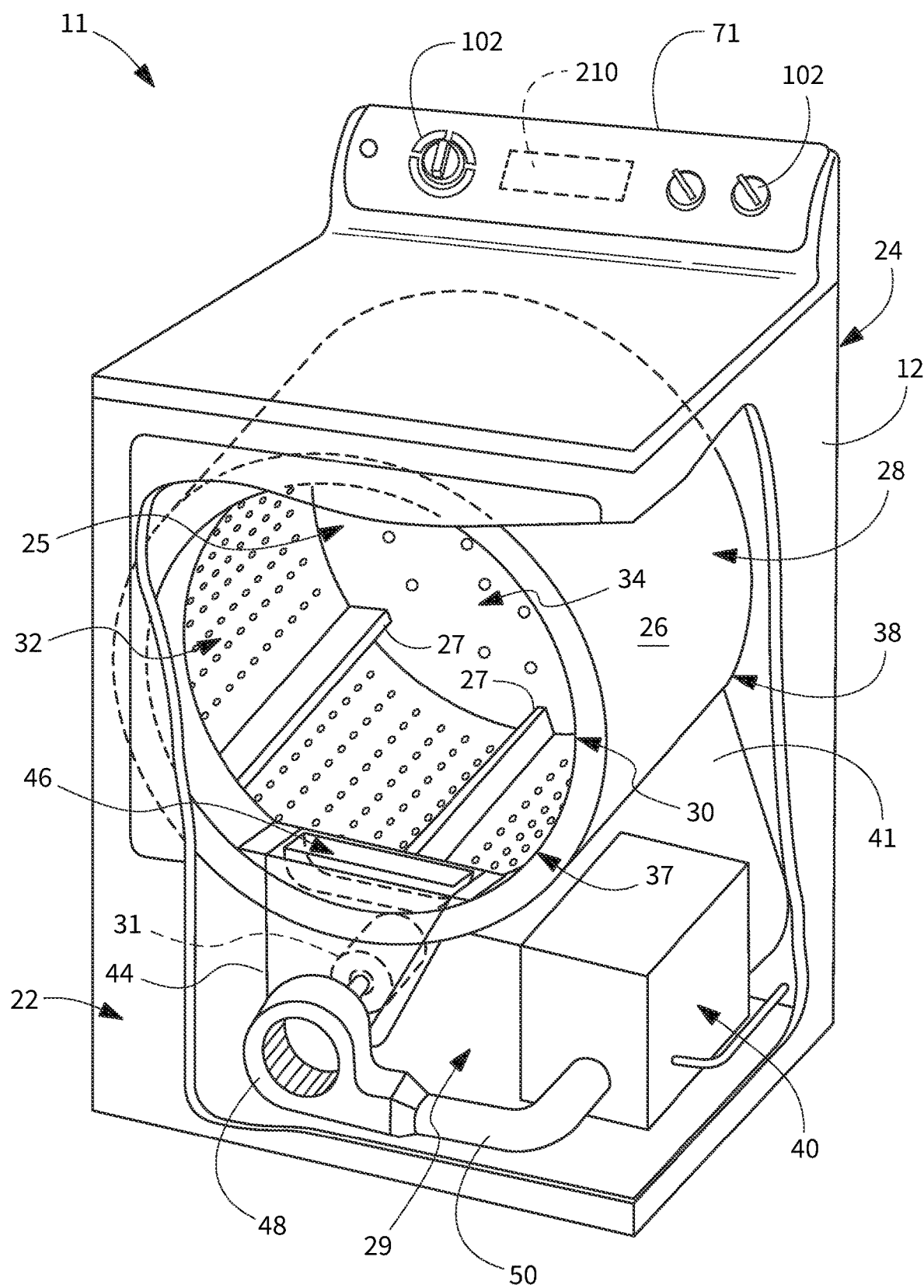
FIG. 3 provides a perspective view of the exemplary dryer appliance of FIG. 1 with portions of a cabinet of the dryer appliance removed to reveal certain components of the dryer appliance.

Exemplary laundry appliances, e.g., a washer and dryer, are illustrated in FIGS. 1 through 3. The term "laundry appliance" or "laundry appliances" are used herein to refer to such appliances as well as any other appliance configured for cleaning, washing, drying, and/or otherwise treating articles. For example, a laundry appliance may also be a combination washer-dryer appliance, among other possibilities.

As may be seen generally throughout FIGS. 1 through 3, a user interface panel 100 and a user input device 102 may be positioned on an exterior of the laundry appliance or each laundry appliance. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance. Operation of the appliance can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance. Controller 210 may include a memory and one or more microprocessors, CPUs or the like, such as general or special purpose microprocessors operable to execute programming instructions or micro-control code associated with operation of the appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, either appliance or both appliances of a pair of laundry appliances 10 and 11 may be the "laundry appliance." In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each laundry appliance 10 and 11.

As generally seen throughout FIGS. 1 through 3, in at least some embodiments, each laundry appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1, which is an example embodiment of a laundry appliance, with a portion of a cabinet or housing 12 of dryer appliance 11 removed in order to show certain components of dryer appliance 11. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 11.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 11 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on the cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 11 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 210.

Figure 4:
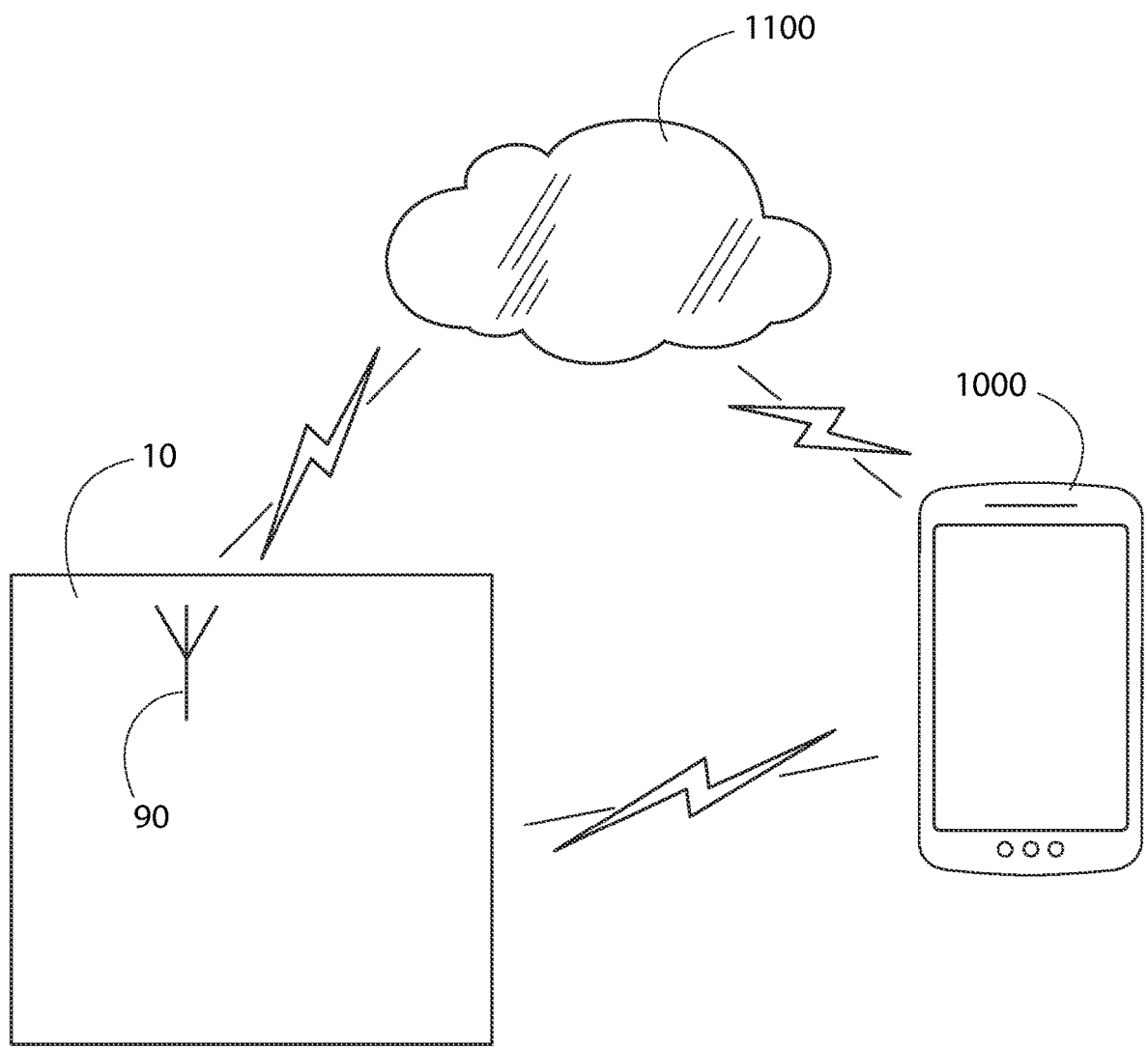
FIG. 4 provides a schematic diagram of a laundry appliance in communication with a remote user interface device and a remote database according to one or more embodiments of the present disclosure.

Turning now to FIG. 4, a general schematic of a laundry appliance, generally designated by reference number 10, and communication features thereof is provided. Usage of reference number 10 in FIG. 4 is not intending to limit the appliance 10 of FIG. 4 to any particular laundry appliance, e.g., the appliance 10 of FIG. 4 may be the washing machine 10 described above which is one example embodiment of a laundry appliance, but is not limited to that particular example, e.g., the laundry appliance 10 of FIG. 4 may be a different washing machine appliance or a dryer appliance, etc. FIG. 4 schematically illustrates a laundry appliance 10, which may be, for example, one of the laundry appliances 10 or 11 of FIGS. 1 through 3, among other possible example laundry appliances, which communicates wirelessly with a remote user interface device 1000. For example, as illustrated in FIG. 4, the laundry appliance 10 may include an antenna 90 by which the laundry appliance 10 communicates with, e.g., sends and receives signals to and from, the remote user interface device 1000. The laundry appliance 10 may communicate with the remote user interface device 1000 over a direct wireless communication link or over an indirect wireless communication link, such as via a remote server, a network, or cloud 1100. The remote user interface device 1000 may be a laptop computer, smartphone, tablet, personal computer, wearable device, smart home system, and/or various other suitable devices.

The cloud 1100 schematically illustrated in FIG. 4 may be or include one or more remote computing devices in a distributed computing environment. The laundry appliance 10, and in particular the controller 210 thereof, may be in communication, e.g., wireless communication, with the cloud 1100. For example, the cloud 1100 may be or include one or more remote computing devices, such as remote computers, servers, and/or databases.

As mentioned above, controller 210 is capable of and may be operable to perform any methods and associated method steps as disclosed herein. In some embodiments, the performance of exemplary methods and associated method steps may be distributed, e.g., performed in part by the controller 210 and in part by one or more remote computing devices in the cloud 1100 and/or remote user interface device 1000.

The laundry appliance 10 may be in communication with the remote user interface device 1000 device through various possible communication connections and interfaces. The laundry appliance 10 and the remote user interface device 1000 may be matched in wireless communication, e.g., connected to the same wireless network. The appliance 10 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the laundry appliance 10 and the remote user interface device 1000. For example, BLUETOOTH® Low Energy may advantageously minimize the power consumed by the exemplary methods and devices described herein due to the low power networking protocol of BLUETOOTH® Low Energy.

The remote user interface device 1000 is "remote" at least in that it is spaced apart from and not physically connected to the laundry appliance 10, e.g., the remote user interface device 1000 is a separate, stand-alone device from the laundry appliance 10 which communicates with the appliance 10 wirelessly. Any suitable device separate from the appliance 10 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 100. For example, the remote user interface device 1000 may be a smartphone operable to store and run applications, also known as "apps," and the remote user interface may be provided as a smartphone app.

As mentioned above, the laundry appliance 10 may also be configured to communicate wirelessly with a remote database 1100. The remote database 1100 may be, e.g., a cloud-based data storage system. For example, the appliance 10 may communicate with the remote database 1100 over the Internet, which the laundry appliance 10 may access via WI-FI®, such as from a WI-FI® access point in a user's home. For example, the laundry appliance 10 may send, e.g., custom cycle requests or selections to the cloud 1100 and may receive, e.g., download, one or more custom cycles from the cloud 1100 to the laundry appliance 10.

Figure 5:
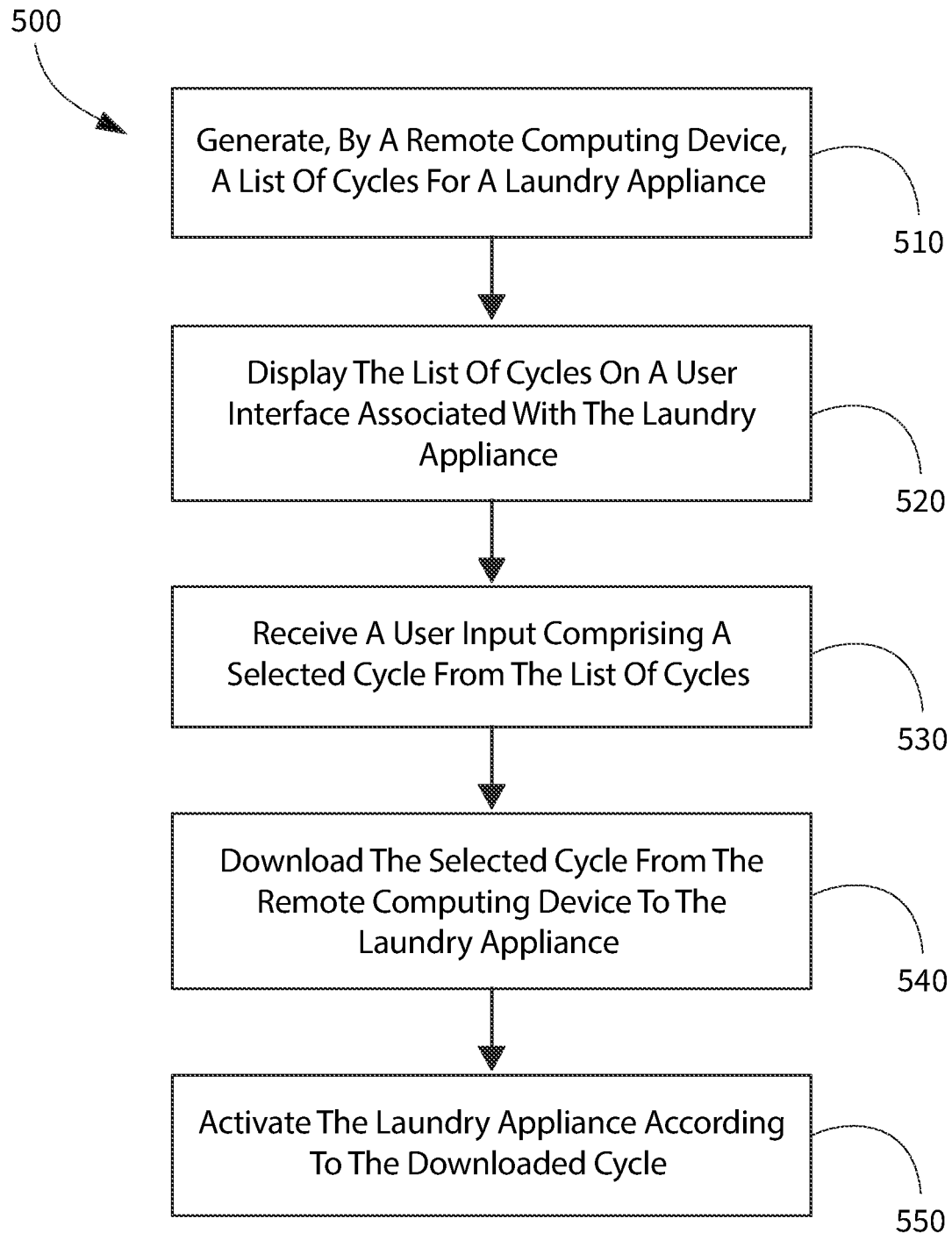
FIG. 5 provides a flowchart illustrating an example method of operating a laundry appliance according to one or more embodiments of the present disclosure.

As illustrated in FIG. 5, embodiments of the present disclosure also include methods for operating a laundry appliance, where the laundry appliance may include any of the foregoing exemplary laundry appliances described above. Further, methods of operating a laundry appliance according to the present disclosure are not necessarily limited to the exemplary appliances described or illustrated.

Exemplary methods according to the present subject matter include the method 500 illustrated in FIG. 5. As illustrated in FIG. 5, the method 500 may include a step 510 of generating a list of cycles for the laundry appliance. The list of cycles may be generated by a remote computing device, such as in the cloud and/or by a remote user interface device. Each cycle in the list of cycles has one or more stages and one or more operating parameters for the laundry appliance associated with one or more of the stages. The list of cycles may also be referred to as a cycle gallery.

Some or all of the stages and associated operating parameters within each cycle may be selectable and adjustable, e.g., whereby a custom cycle may be generated. Stages of a cycle may be adjusted by, for example, adding, deleting, duplicating, and/or reordering the stages. Additionally, the stages may be adjusted by setting or changing a value for one or more of the operating parameters of the stage or each stage. The range of adjustability for some stages or operating parameters may be constrained or locked. For example, a drain stage may include operating parameters such as a drain pump activation time or duty cycle. The drain stage may be adjustable in that the drain stage may be duplicated or extended, e.g., having more than one drain stage or a longer drain pump activation time, however, the range of adjustments to the drain stage may be constrained such as there may always be at least one drain stage in a wash cycle, and the drain stage (or one of the drain stages when a wash cycle includes multiple drain stages) may always be the last stage of the wash cycle. Additionally, the adjustment to the drain stage may be constrained by a minimum value for the drain pump activation time parameter. As another example, in various embodiments, the drain pump or other pump such as a circulation pump may be a variable speed pump and a pump speed may be a selectable and adjustable operating parameter for related stages of the cycle. When pump speed is adjustable, such adjustments may be constrained, e.g., within a minimum and/or maximum speed. Referring again to the drain stage example in particular, the drain stage may be locked, e.g., the drain stage may be unable to be selected or adjusted such that the drain stage may not be, e.g., deleted or reordered, and, when the drain stage is locked, there may be no selectable or adjustable operating parameters associated with the drain stage. For example, the drain stage may be controlled by or based on a water level reading, e.g., from a pressure sensor or other sensor within the washing machine appliance, and the duration of the drain stage may thus be automatically determined, e.g., by a controller of the washing machine appliance in communication with the sensor, or the duration of the drain stage may be limited to a predetermined value that is not selectable or adjustable, whereby the drain stage may be locked and may include no selectable or adjustable operating parameters. As another example, a load size detection stage may include operating parameters such as one or more rotational speeds for the basket of the washing machine appliance, but such parameters may be locked, e.g., not selectable or adjustable, because the load detection calculations may be based on sensing a size or weight of the load based on motor torque or power at known speeds, such that adjusting the rotational speeds during the load size detection may be undesirable in that such adjustments may result in decreased accuracy of the load size detection.

Method 500 may further include a step 520 of displaying the list of cycles on a user interface associated with the laundry appliance. For example, the list of cycles may be presented to the user on a display, such as a display of the laundry appliance (e.g., display component 104 of user interface panel 100 as described above) or on the remote user interface device 1000 (also described above).

In some embodiments, method 500 may further include a step 530 of receiving a user input. The user input may be received from a user interface of the laundry appliance. The user interface may be directly and physically connected to the appliance, e.g., may be one of the user input devices 102 described above, and/or may be a remote user interface, such as a smartphone app, as mentioned above in reference to FIG. 4. The user input may include a selected cycle from the list of cycles.

Method 500 may also include a step 540 of downloading the selected cycle to the laundry appliance. The step 550 of downloading selected cycle may be performed in response to the user input. After the selected cycle from the list of cycles has been downloaded, the appliance may then be activated according to the downloaded cycle, such as the method 500 may then proceed to step 550 as indicated in FIG. 5. For example, the cycle may be downloaded to the controller of the appliance, such as a memory thereof, and the downloaded cycle may include instructions and parameters for operating the appliance, whereby activating the appliance according to the downloaded cycle includes activating one or more components of the appliance, such as a pump or motor, etc., in the laundry appliance according to the downloaded instructions and with the downloaded operating parameters in the selected cycle.

In some embodiments, method 500 may further include receiving, by the remote computing device, a plurality of uploads of user-generated cycles for the laundry appliance from multiple users. In such embodiments, the list of cycles may include user-generated cycles from the plurality of uploads, such as the list of cycle may consist of only user-generated cycle, or the list of cycles may include user-generated cycles as well as cycles generated and published by the manufacturer of the laundry appliance.

In various embodiments, the list of cycles may include descriptive information for some or all of the cycles in the list. Such information may aid a user in searching for, sorting, and/or selecting a cycle or cycles from the list. For example, the list of cycles may include a description of each cycle, download statistics for each cycle, and one or more tags for each cycle.

In some embodiments, the list of cycles may be a ranked list ranked by weight. For example, the cycles in the list may be weighted based on relevance to one or more search criteria entered by a user. As another example, the cycles in the list may be weighted based on similarity to one or more cycles of the laundry appliance which are frequently used, e.g., based on a selection count as described below.

In some embodiments, the list of cycles may be dynamic, e.g., may be added to as additional users provide newer user-generated cycles. Further, the communication between the laundry appliance and the remote computing device may go both ways, e.g., including both uploading custom cycles and downloading other custom cycles. For example, embodiments of method 500 may also include building a custom cycle for the laundry appliance and uploading the custom cycle to the remote computing device. In some embodiments, the custom cycle may be built on a remote user interface device and uploaded to the remote computing device from the remote user interface device.

In some embodiments, the custom cycle may include one or more stages. In such embodiments, building the custom cycle may include adjusting one or more of the stages and/or one or more operating parameters for at least one of the stages, e.g., as mentioned above. For example, adjusting the stages of the cycle may include adding, deleting, duplicating, and/or reordering the stages. As another example, adjusting an operating parameter may include changing a value of the operating parameter, which may be open-ended or constrained, e.g., by a minimum value and/or maximum value for the parameter. In some exemplary embodiments, building the custom cycle may include receiving an input comprising a user-selected operating parameter value for at least one stage of the custom cycle. For example, the user-selected operating parameter may be received at a user interface of the laundry appliance, e.g., an integral user interface structurally connected to the laundry appliance (such as user interface panel 100 and user input device 102 thereon) or an interface on the remote user interface device. Thus, the custom cycle may be manually built, e.g., based on a received user input for each operating parameter of each stage of the custom cycle, or may be partially manually built, e.g., based on a received user input for at least one operating parameter of one or more stages of the custom cycle.

In some embodiments, building the custom cycle may include receiving a user input from a user interface of the laundry appliance. In such embodiments, the user input may include a selected cycle of the laundry appliance, and the method may then include recommending operating parameter values for at least one stage of the custom cycle based on the selected cycle of the laundry appliance. For example, each time a cycle is selected or an operating parameter value for the cycle is input, the method may include incrementing a selection count corresponding to the selected cycle or parameter. The selection count may be stored locally on the laundry appliance and/or in the cloud. For example, the selection count may be stored in a local memory, e.g., onboard the controller 210 of the laundry appliance, and/or remotely, e.g., in the cloud 1100. The selection count may be part of a user profile, e.g., in the cloud. The user profile may include a list of operating parameter values and/or cycles that have been selected by the user via a plurality of received user inputs over time. For example, as the consumer uses the laundry appliance, a custom user profile for the consumer is built or developed, and the custom user profile reflects the consumer's tastes, habits, and preferences, e.g., the consumer's most-used cycles or favorite cycles of the connected laundry appliance or each connected laundry appliance. For example, multiple selection counts for various operating parameter values or cycles may be stored, and, in some embodiments, the list of available cycles may be sorted or ranked based on an associated selection count of similar cycles, e.g., a selection count associated with cycles that are used more frequently and thus have a higher selection count may result in a similar cycle in the list being ranked higher than other cycles in the list that are similar to or have common operating parameter values as cycles that are used less frequently and thus have a lower selection count. Thus, the selection count may permit customization of the laundry appliance by indicating which features the consumer prefers based on which features are associated with cycles (and/or operating parameter values) having a high selection count, e.g., weighting cycles in the list according to the selection count(s) of one or more similar cycles.

As mentioned above, in some embodiments, the list of cycles may be ranked by weight. For example, the weighting may be based on (e.g., either directly based on or derived from) the selection count(s) of one or more cycles having stages and/or operating parameters thereof in common with or similar to stages and/or operating parameters associated with each of the listed cycles.

In some embodiments, the method may further include comparing the selection count to a plurality of cycles available for download, e.g., in a cycle gallery stored in the cloud such as stored in a remote server. Each cycle in the cycle gallery may have one or more operating parameter values associated therewith. Thus, in some embodiments, the comparison may include identifying cycles of the plurality of cycles available for download which have common or similar operating parameter values as cycles of the laundry appliance having the highest selection count. Further, when one or more of the cycles has more than one operating parameter value associated therewith in common with a previously-selected cycle, a cumulative or multiplied selection count may be used in the comparison, e.g., to sort or rank the cycles of the plurality of cycles available for download.

In some embodiments, the custom cycle may be automatically built, or the custom cycle building may be at least partially automated. For example, building the custom cycle may include detecting a common load in consecutive cycles of the laundry appliance and synthesizing the consecutive cycles into the custom cycle. For example, the common load may be detected based on a time between the consecutive cycles being less than a threshold time, based on a door opening not being detected between the consecutive cycles, or based on a same or similar load size (e.g., weight) being detected in both of the consecutive cycles. In another example, the custom cycle may also or instead be automatically built based on qualitative user feedback. For example, building the custom cycle may include receiving a user input, the user input may include qualitative feedback regarding one or more cycles of the laundry appliance, and the method may then include automatically building the custom cycle based on the user input. In various embodiments, the qualitative feedback may relate to cycle inputs and/or cycle results. As one example, qualitative feedback related to cycle inputs may include types of clothes the user wears, when the user wears such clothing, e.g., distinguishing weekday work clothes from weekend casual clothes and inferring a correlated frequency of washing each type, as well as daily activities and the intensity of those activities, among other preemptive or predictive details of the user's clothing and/or habits which may influence the desired wash cycle characteristics. For example, the wearing schedule, e.g., weekday versus weekend as noted above may be used to infer a soil level of articles to be washed. As another example, the custom cycle may include higher agitation levels in an agitation cycle in response to a user feedback from a user who frequently plays rugby and thus is more likely to have heavy grass, blood, etc. stains on his or her clothing. As another example, the qualitative feedback related to cycle results may include an indication that articles were too wet when removed from the dryer appliance, and the custom cycle may include extended dry time, higher drying temperature, or higher spin speed in the washing machine appliance. As another example, the qualitative feedback may include an indication that the articles were too hot after the drying operation, e.g., when removed from the dryer appliance, in which case the custom cycle may include reduced dry time or temperature.

The custom cycle building may also be guided, e.g., with prompts or suggestions for selectable operating parameter values, or constraints may be included on the range of possible values that can be selected for a particular operating parameter or parameters. In one example guided custom cycle building method, building the custom cycle may include receiving a user input from a user interface of the laundry appliance, and the user input may include a selected cycle of the laundry appliance. For example, the user input may include one or more selected options for the selected cycle of the laundry appliance. The user input may also or instead include qualitative feedback related to cycle inputs or results, as discussed above. In such embodiments where the custom cycle building is guided, the guidance may include recommending operating parameter values for at least one stage of the custom cycle. For example, such recommendation may be based on the selected cycle of the laundry appliance, such as recommending a longer spin time or faster spin speed if the selected cycle is a cycle associated with highly absorptive articles. As another example, the recommendation may include a heat setting for a dryer appliance that is based on the type of clothing worn most frequently according to qualitative user feedback, such as low heat for synthetic fiber clothing or high heat for natural fiber clothing, etc.

Figure 6:
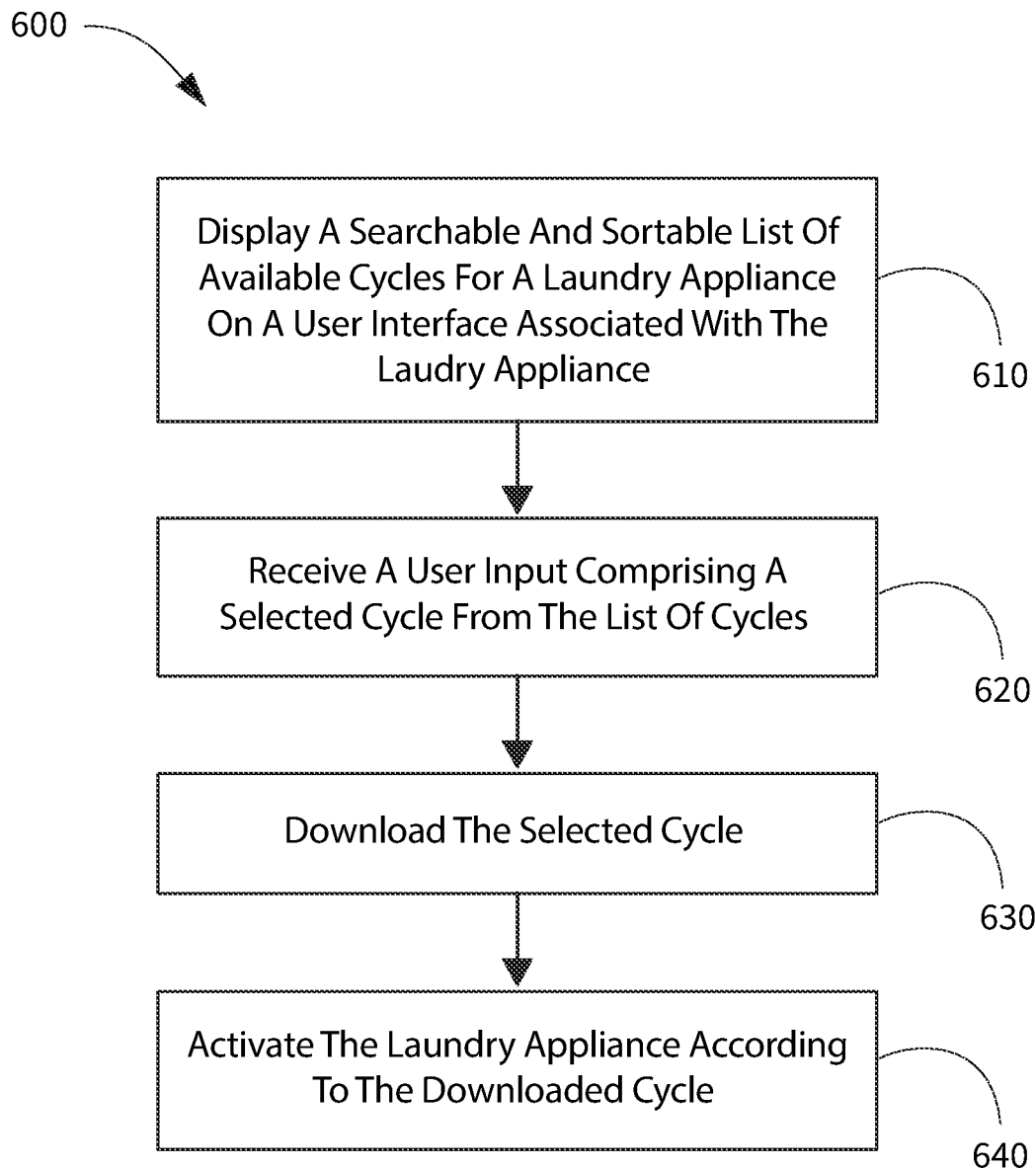
FIG. 6 provides a flowchart illustrating an additional example method of operating a laundry appliance according to one or more further embodiments of the present disclosure.

Turning now to FIG. 6, another exemplary method 600 of operating a laundry appliance is illustrated therein. The method 600 may include a step 610 of displaying a searchable and sortable list of available cycles for the laundry appliance on a user interface associated with the laundry appliance. The display used in step 610 may be generally similar to the display used in step 520, which has already been described above, e.g., display component 104 or the display of a remote user interface device. For example, the searchable and sortable list of available cycles for the laundry appliance may be displayed on a display screen on the laundry appliance and/or on a remote user interface device. In some embodiments, the list of cycles may include a description of each cycle, download statistics for each cycle, and/or one or more tags for each cycle. In such embodiments, the list may be searchable by description, download statistics, and/or tags (whichever are provided), and the list may be sortable by description, download statistics, and tags (whichever are provided).

Method 600 may further include a step 620 of receiving a user input, and the user input may include a selected cycle from the list of cycles. In some embodiments, method 600 may further include a step 630 downloading the selected cycle to the laundry appliance. Also as shown in FIG. 6, the method 600 may further include an activating step 640 after the downloading step 630 and both steps 630 and 640 may be similar to steps 540 and 550, respectively, described above with reference to FIG. 5.

Referring now generally to FIGS. 5 and 6, the methods 500 and/or 600 may be interrelated and/or may have one or more steps from one of the methods 500 and 600 combined with the other method 500 or 600.

For example, the list of available cycles in method 600 may be dynamic, may include user-generated custom cycles, and may receive uploaded custom cycles which are built based on the laundry appliance, e.g., as described above with respect to method 500. Additionally, a custom cycle according to method 600 may be built automatically, manually, or with guidance, or combinations thereof, e.g., also as described above with respect to method 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry appliance, the method comprising:
building a custom cycle for the laundry appliance, wherein building the custom cycle comprises detecting a common load in consecutive cycles of the laundry appliance and synthesizing the consecutive cycles into the custom cycle;
uploading the custom cycle to a remote computing device;
generating, by the remote computing device, a list of cycles for the laundry appliance, each cycle having one or more stages and one or more operating parameters for the laundry appliance associated with one or more of the stages, the list of cycles comprising the uploaded custom cycle;
displaying the list of cycles on a user interface associated with the laundry appliance;
receiving a user input, the user input comprising a selected cycle from the list of cycles;
downloading the selected cycle to the laundry appliance; and
activating the laundry appliance according to the downloaded cycle.

2. The method of claim 1, further comprising receiving, by the remote computing device, a plurality of uploads of user-generated cycles for the laundry appliance from multiple users, wherein the list of cycles comprises user-generated cycles from the plurality of uploads.

3. The method of claim 1, wherein the list of cycles includes a description of each cycle, download statistics for each cycle, and one or more tags for each cycle.

4. The method of claim 1, wherein the list of cycles further comprises an additional custom cycle, wherein the additional custom cycle is built on a remote user interface device and uploaded to the remote computing device from the remote user interface device.

5. The method of claim 1, further comprising building an additional custom cycle, wherein the list of cycles further comprises the additional custom cycle, wherein the additional custom cycle comprises one or more stages, and wherein building the additional custom cycle comprises receiving an input comprising a user-selected operating parameter value for at least one stage of the additional custom cycle.

6. The method of claim 1, further comprising building an additional custom cycle, wherein the list of cycles further comprises the additional custom cycle, wherein building the additional custom cycle comprises receiving a user input from a user interface of the laundry appliance, the user input comprising a selected cycle of the laundry appliance, and recommending operating parameter values for at least one stage of the additional custom cycle based on the selected cycle of the laundry appliance.

7. The method of claim 1, further comprising building an additional custom cycle, wherein the list of cycles further comprises the additional custom cycle, wherein building the additional custom cycle comprises receiving a user input, the user input comprising qualitative feedback regarding one or more cycles of the laundry appliance, and automatically building the additional custom cycle based on the user input.

8. The method of claim 1, wherein the list of cycles is a ranked list ranked by weight.

9. A method of operating a laundry appliance, the method comprising:
building a custom cycle for the laundry appliance, wherein building the custom cycle comprises detecting a common load in consecutive cycles of the laundry appliance and synthesizing the consecutive cycles into the custom cycle;
displaying a searchable and sortable list of available cycles for the laundry appliance on a user interface associated with the laundry appliance, wherein the searchable and sortable list of available cycles for the laundry appliance comprises the custom cycle;
receiving a user input, the user input comprising a selected cycle from the list of cycles;
downloading the selected cycle to the laundry appliance; and
activating the laundry appliance according to the downloaded cycle.

10. The method of claim 9, further comprising receiving, by a remote computing device, a plurality of uploads of user-generated cycles for the laundry appliance from multiple users, wherein the list of available cycles is generated by the remote computing device and comprises user-generated cycles from the plurality of uploads.

11. The method of claim 10, wherein the plurality of uploads of user-generated cycles for the laundry appliance from multiple users comprises an additional custom cycle, further comprising building the additional custom cycle for the laundry appliance and uploading the additional custom cycle to the remote computing device.

12. The method of claim 11, wherein the additional custom cycle is built on a remote user interface device and uploaded to the remote computing device from the remote user interface device.

13. The method of claim 11, wherein the additional custom cycle comprises one or more stages, and wherein building the additional custom cycle comprises receiving an input comprising a user-selected operating parameter value for at least one stage of the additional custom cycle.

14. The method of claim 11, wherein building the additional custom cycle comprises receiving a user input from a user interface of the laundry appliance, the user input comprising a selected cycle of the laundry appliance, and recommending operating parameter values for at least one stage of the additional custom cycle based on the selected cycle of the laundry appliance.

15. The method of claim 11, wherein building the additional custom cycle comprises receiving a user input, the user input comprising qualitative feedback regarding one or more cycles of the laundry appliance, and automatically building the additional custom cycle based on the user input.

16. The method of claim 9, wherein the list of cycles includes a description of each cycle, download statistics for each cycle, and one or more tags for each cycle, wherein the list is searchable by description, download statistics, and tags, and wherein the list is sortable by description, download statistics, and tags.

17. The method of claim 9, wherein the list of cycles is a ranked list ranked by weight.

* * * * *